(No Model.)
W. H. GRIFFITHS.
PAPER HOLDER AND CUTTER.
No. 540,589. Patented June 4, 1895.
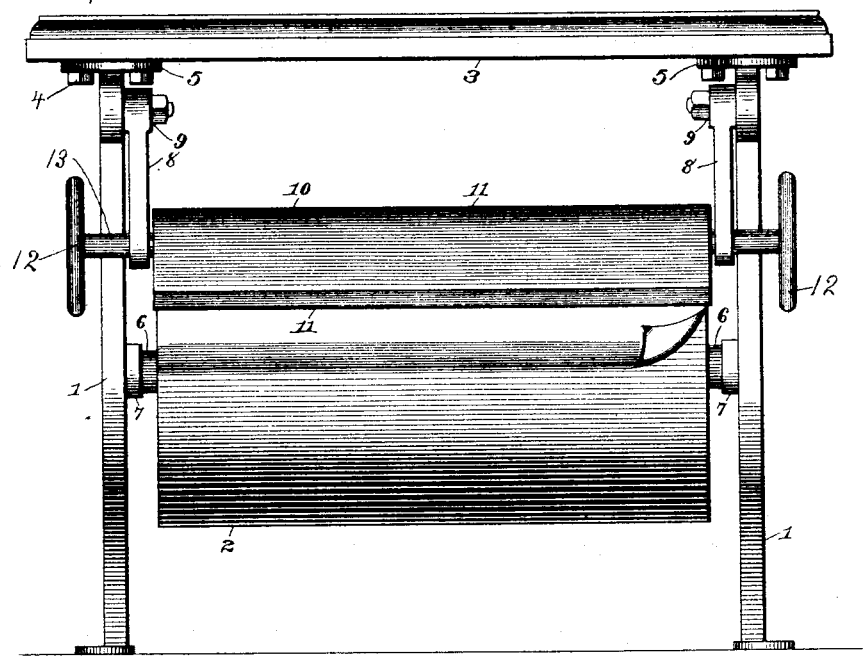
Fig. 1.
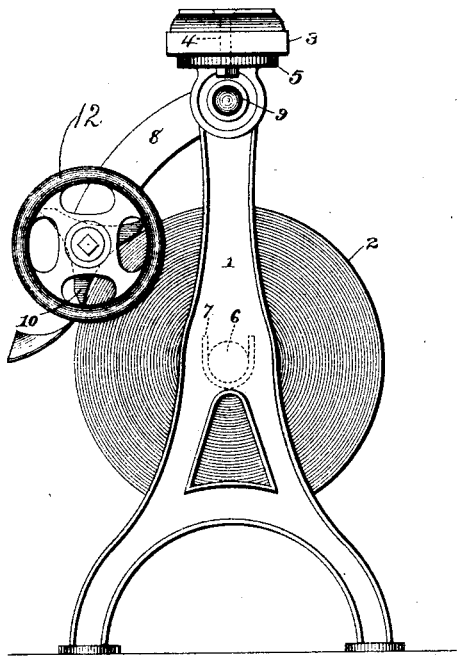
Fig. 2.
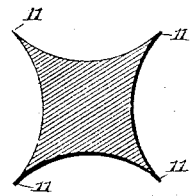
Fig. 3.   Fig. 4.
Fig. 5.
Witnesses
G. T. Myers
R. H. Young
Inventor
W. H. Griffiths
By Joseph W. Atkins
Attorney
THE NORRIS PETERS CO., PHOTO-LITHO., WASHINGTON, D. C.

United States Patent Office.

WILLIAM H. GRIFFITHS, OF BOSTON, ASSIGNOR TO CHARLES H. WRIGHT, OF CAMBRIDGE, MASSACHUSETTS.

PAPER HOLDER AND CUTTER.

SPECIFICATION forming part of Letters Patent No. 540,589, dated June 4, 1895.

Application filed March 17, 1894. Renewed April 15, 1895. Serial No. 545,823. (No model.)

*To all whom it may concern:*

Be it known that I, WILLIAM H. GRIFFITHS, of Boston, in the county of Suffolk, State of Massachusetts, have invented certain new and useful Improvements in Paper Holders and Cutters, of which the following is a specification, reference being had to the accompanying drawings.

The object of my invention is to produce improvements in paper holders and cutters of that class in which a roll, or the like, of paper is carried in a frame, and from which portions are designed to be severed from time to time, as occasion may require, and it consists of a frame or standard having bearings in which the roll-carrying spool is supported, in combination with arms pivoted to said frame or standard, a combined feeder and cutter rotatably supported in said pivoted arms, and means for rotating said feeder and cutter to feed the paper and successively present different cutting edges.

In the accompanying drawings, Figure 1 is a front elevation of my holder and cutter. Fig. 2 is an end elevation thereof. Fig. 3 is a cross-section of one form of cutter; Fig. 4, a similar view of another form, and Fig. 5 a similar view of a third form.

Referring to the figures on the drawings, 1 indicates the end pieces of the frame which act as supports or standards for the paper 2. They are preferably united by a cross piece 3 to which they may be secured by suitable means, as for example, bolts 4 passing through disk heads 5 upon the upper ends of the end pieces.

The paper is usually carried in a continuous roll wrapped around a spool 6 that is journaled in U-shaped bearings 7 in the opposite inner walls of the end pieces.

8 indicates swinging pendent arms pivoted, as indicated at 9, to the upper ends of the end pieces, and designed to support a rotatable combined cutter and feeder 10.

The combined cutter and feeder 10 may be made of any suitable shape so as to produce a plurality of cutting edges 11, that may be brought successively into the cutting operation. It is preferably carried upon journals 13 which are revolubly supported upon the arm 8, as illustrated. Upon the ends of the journals 13, respectively, I provide hand wheels 12, by which the knife may be rotated upon the journals when required.

The purpose of providing the rotatable combined cutter and feeder with a plurality of cutting edges, is not only to render different cutting edges available at all times, but also in order that by the rotation thereof, one of the cutting edges may bite into the paper and turn the roll of paper on its journal. In this manner the part 10 acts as a positive feed for the paper, so as to present the end thereof sufficiently in advance of the cutting edge to enable the operator to grasp it and draw the desired length from the roll and then detach the same by drawing it against the active cutting edge.

By supporting the combined cutter and feeder 10 in the pivoted arms 8, when one of the hand wheels 12, is operated the arms 8 will automatically rise and permit the rotation of the combined cutter and feeder and the consequent presentation of a different cutting edge and a positive feed of the paper as before explained.

In Figs. 3, 4, and 5 different forms of cutters are illustrated. It may be observed from these illustrations that the cutting edges, indicated by Fig. 11 are so located upon the cutter, as to make it possible by rotating the cutter in its bearing, to bring each of the cutting edges successively into perfect operative position.

What I claim is—

The herein described roll paper-holder and cutter consisting of a frame or standard having bearings in which the roll carrying spool is supported, in combination with arms pivoted to said frame or standard, a combined feeder and cutter rotatably supported in said pivoted arms, and means for rotating said feeder and cutter to feed the paper and successively present different cutting edges, substantially as described.

In testimony of all which I have hereunto subscribed my name.

WILLIAM H. GRIFFITHS.

Witnesses:
E. B. CALLENDER,
DANIEL C. KNOWLTON.